United States Patent [19]

Skelton et al.

[11] Patent Number: 5,713,247
[45] Date of Patent: Feb. 3, 1998

[54] TRUNNION REINFORCING RING

[75] Inventors: Jack E. Skelton, Lake James; Mark C. Barnholt; Patrick J. Ballinger, both of Fort Wayne, all of Ind.

[73] Assignee: Dana Corporation, Toledo, Ohio

[21] Appl. No.: 800,335

[22] Filed: Feb. 14, 1997

Related U.S. Application Data

[63] Continuation of Ser. No. 390,661, Feb. 17, 1995, abandoned.

[51] Int. Cl.$^6$ ................................................ F16H 57/02
[52] U.S. Cl. ................................................ 74/607; 74/606 R
[58] Field of Search ................................. 74/606 R, 607

[56] References Cited

U.S. PATENT DOCUMENTS

| 783,168 | 2/1905 | Baker . | |
|---|---|---|---|
| 1,400,949 | 12/1921 | Frey . | |
| 1,610,958 | 12/1926 | Leister . | |
| 2,478,180 | 8/1949 | Buckendale | 74/607 |
| 3,303,721 | 2/1967 | Puidokas | 74/607 |
| 3,726,154 | 4/1973 | Diessner | 74/607 |
| 3,905,089 | 9/1975 | Osenbaugh et al. | 74/607 X |
| 4,183,263 | 1/1980 | Osenbaugh | 74/606 R |
| 4,461,373 | 7/1984 | Pratt et al. | 192/4 A |
| 4,563,913 | 1/1986 | Hartz et al. | 74/606 R |
| 4,787,267 | 11/1988 | Kessler | 74/606 |

Primary Examiner—Vinh T. Luong
Attorney, Agent, or Firm—Oldham & Oldham Co., LPA

[57] ABSTRACT

An apparatus comprising a support structure having at least one trunnion which is adapted to receive a generally cylindrical hollow tube. The trunnion includes an annular groove formed in an outer surface. The apparatus further comprises an annular reinforcing ring disposed in the annular groove. The support structure is preferably made of a non-ferrous metallic alloy and the reinforcing ring may be made of either a ferrous metal, such as iron or a steel alloy, or may be made of a composite material. The support structure may comprise an axle carrier or a disconnect housing of an axle drive assembly, or any other support structure having a trunnion which accepts a generally cylindrical hollow tube. The support structure may comprise a casting, and the reinforcing ring may comprise a prefabricated, one-piece construction which is cast in place in the trunnion groove of the support structure. Alternatively, the reinforcing ring may comprise a prefabricated one-piece construction which is pressed in place in the trunnion groove, or may comprise a two-piece construction with each piece disposed in the trunnion groove and fastened to one another.

20 Claims, 4 Drawing Sheets

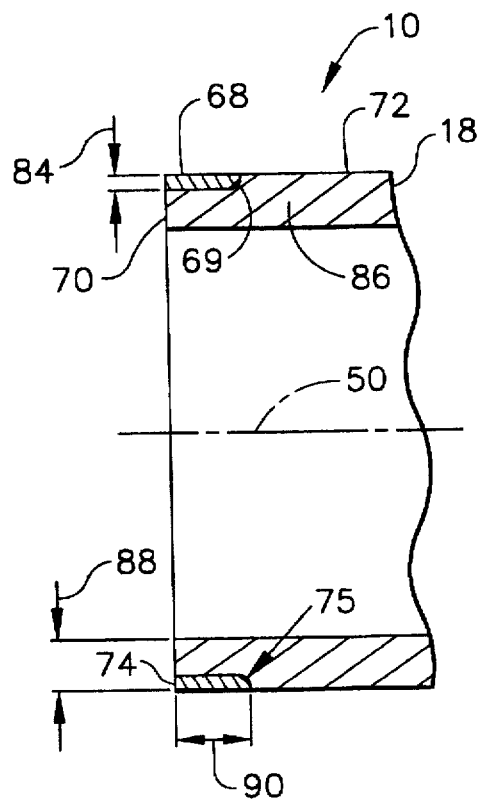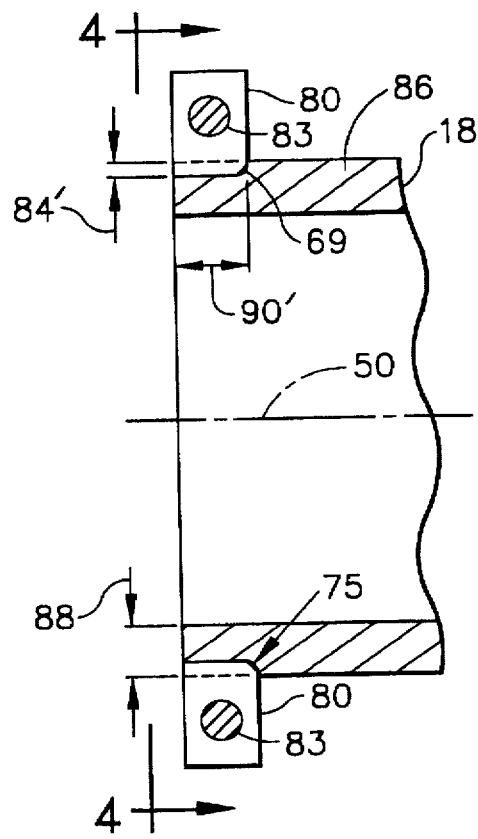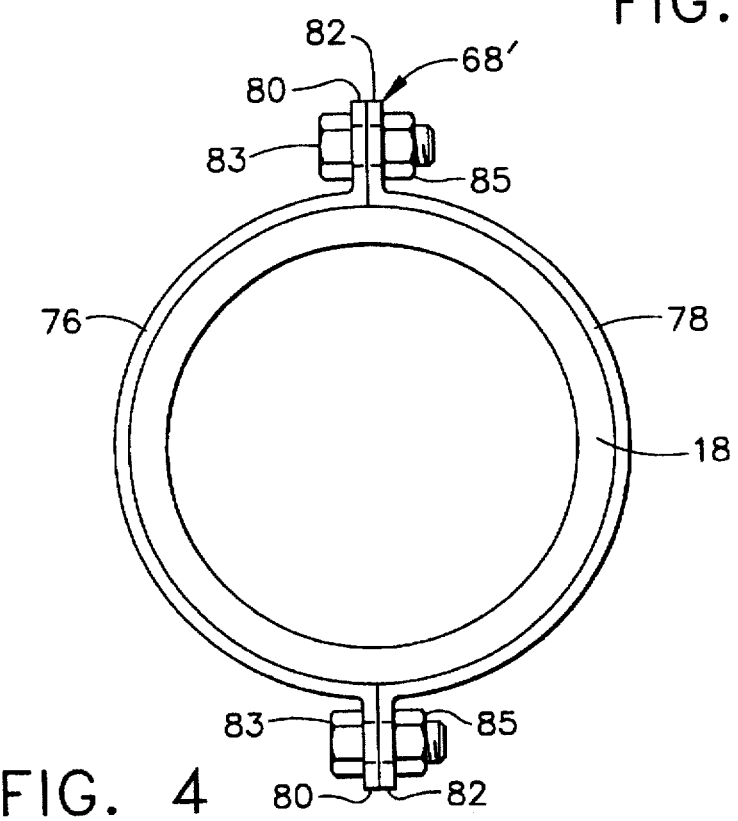

5,713,247

TRUNNION REINFORCING RING

This is a continuation of application Ser. No. 08/390,661 filed on Feb. 17, 1995 now abandoned.

BACKGROUND OF THE INVENTION

1.0 Field of the Invention

The present invention relates generally to a support structure trunnion and, more particularly, to a trunnion having a reinforcing ring attached thereto.

2.0 Related Art

Carrier-type axle housing assemblies, commonly referred to as a Salisbury design, have been utilized in the automotive industry for some time. With this type of axle housing, an axle tube is pressed into each one of a pair of carrier trunnions, with each tube being plug welded to the carrier through radially extending holes formed in the corresponding carrier trunnion. An additional hole is formed in each trunnion for purposes of spreading the carrier in order to properly preload the differential bearings during installation of the differential which is housed within the carrier. The carrier trunnions require strength to withstand, or carry stress from two primary sources: the hoop stress resulting from the interference fit between the axle tube and the trunnion; and the relatively large bending moments and associated bending stresses at the trunnion-to-tube connections caused by suspension loads applied at the spring attachments and wheels. More recently, cast aluminum or other non-ferrous alloys have been utilized to manufacture the axle carriers in place of cast iron in response to customer demands for weight reduction, and the associated increase in fuel efficiency of the vehicle. The outboard ends of the trunnions have been known to comprise fracture origin cites during overload testing of aluminum axle carriers, due to the relatively high combined stress field existing at this location on the carrier trunnions. Accordingly, at the time of the present invention, automotive design engineers continue to search for new and improved axle carriers having comparable strength but reduced weight as compared to prior, ferrous material axle carriers.

SUMMARY

Accordingly, the present invention is directed to an apparatus comprising a support structure having at least one trunnion which is adapted to receive a generally cylindrical hollow tube, wherein the trunnion includes an outer surface and an annular groove formed in the outer surface. The apparatus further includes an annular reinforcing ring disposed in the annular groove.

A main advantage of the present invention is the enhancement of the impact strength of a trunnion included in a lightweight support structure, without significantly compromising the weight advantage derived from the lightweight material used in manufacturing the support structure.

BRIEF DESCRIPTION OF THE DRAWINGS

The aforementioned advantage, as well as the structural features and functions, and other advantages of the present invention, will become more apparent from the subsequent detailed description of the preferred embodiments when taken in connection with the accompanying drawings, wherein:

FIG. 2 is an enlarged cross-sectional frontal view further illustrating one of the axle carrier trunnions illustrated in FIG. 1;

FIG. 3 is an enlarged cross-sectional frontal view further illustrating one of the axle carrier trunnions illustrated in FIG. 1 with an alternative reinforcing ring;

FIG. 4 is an end view taken along line 4—4 in FIG. 3;

DETAILED DESCRIPTION

Figure 1:
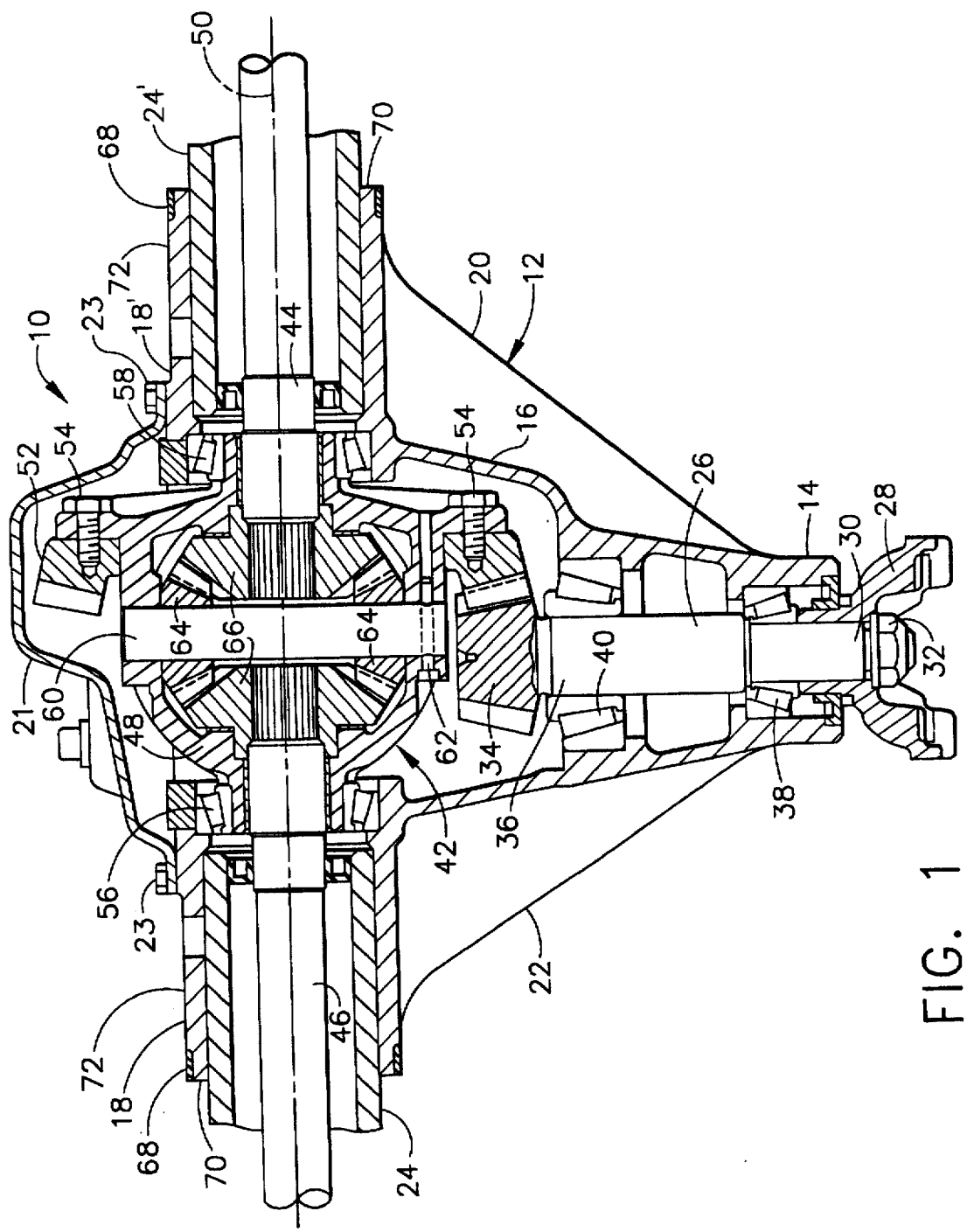
FIG. 1 is a cross-sectional top view illustrating an axle assembly incorporating an axle carrier according to a preferred embodiment of the present invention.

Referring now to the drawings, wherein like reference numerals have been used for similar elements throughout, FIG. 1 is a cross-sectional view illustrating an axle assembly 10 which incorporates a support structure such as axle carrier 12 according to the present invention. Axle assembly 10 comprises a beam axle assembly, where the axle assembly 10 supports the suspension loads of the associated vehicle. The axle assembly 10 may comprise a forward axle assembly, which is subjected to significant impact loads, but axle assembly 10 may also be advantageously utilized as a rear axle assembly. Axle carrier 12 includes a shaft receiving portion 14, a central, differential-receiving portion 16 attached to shaft receiving portion 14, and a pair of generally cylindrical, hollow trunnions 18, 18' protruding from opposite sides of the differential-receiving portion 16. Axle carrier 12 preferably comprises a one-piece construction and preferably is made of a cast aluminum alloy. Alternatively, carrier 12 may be made of a cast magnesium alloy, or may be cast from other suitable lightweight alloys. Additionally, carrier 12 may alternatively comprise a two-piece construction and may be manufactured by methods other than casting. Axle carrier 12 may optionally include strengthening ribs 20 and 22. Assembly 10 further includes a cover 21 which is fastened to carrier 12 with bolts 23 and includes a pair of generally cylindrical, hollow axle tubes 24,24' with each of the tubes 24,24' being respectively inserted into one of the trunnions 18,18'. Axle carrier 12 combines with each of the axle tubes 24,24' to form a pair of carrier-type axle housings.

Assembly 10 includes a pinion shaft 26 carrying yoke 28 at a first end 30 of shaft 26. Yoke 28 is secured to end 30 of shaft 26 via a nut 32 and is effective for receiving torque from driving member (not shown) of the motor vehicle. A pinion gear 34 is rigidly affixed to a second, opposite end 36 of shaft 26. Pinion shaft 26 is rotatably supported within the shaft-receiving portion 14 of axle carrier 12 via bearing assemblies 38 and 40, respectively. Axle assembly 10 further includes a differential assembly, indicated generally at 42, which is effective for transferring torque from pinion shaft 26 to first and second output shafts, 44 and 46, respectively, of assembly 10. Torque is transferred to output shafts 44 and 46 via differential assembly 42 in a conventional manner so as to permit differential rotation between shafts 44 and 46. Differential assembly 42 includes a case 48 which is rotatable about a longitudinal centerline axis 50 of differential assembly 42. The centerline axis 50 of assembly 42 is coincident with the longitudinal centerline of output shafts 44 and 46. An annular face gear 52 is fastened to case 48 by conventional means such as bolts 54. Torque is transferred from pinion shaft 26 to case 48, which is rotatably supported within axle carrier 12 via bearing assemblies 56 and 58, respectively, via the meshing engagement of drive pinion gear 34 and the annular face gear 52. The differential assembly 42 further includes a cross pin shaft 60 having opposing ends disposed in bores formed in the rotatable case 48. Shaft 60 is retained in case 48 by locking pin 62. The differential assembly 42 further includes a pair of pinion gears 64 rotatably mounted on the shaft 60 and longitudinally spaced apart. Additionally, assembly 42 includes a pair of side gears 66, which preferably comprise bevel gears, with each of the bevel side gears 66 rigidly affixed to one of the output shafts 44 and 46 for rotation therewith. Accordingly, rotation of case 48 about centerline axis 50 results in rotation of output shafts 44 and 46. The interrelationship among pinion gears 64, side gears 66 and output shafts 44 and 46 permits differential, or relative rotation to exist between output shafts 44 and 46, which is required during certain operating conditions such as vehicle cornering. Output shafts 44 and 46 are rotatable within the corresponding ones of axle tubes 24,24'.

As shown in FIG. 1 and FIG. 2, which is an enlarged partial cross-sectional view of one of the trunnions 18,18' shown in FIG. 1, assembly 10 further includes a pair of annular reinforcing rings 68, with each ring 68 attached to one of the trunnions 18,18' adjacent an outboard end 70 of the trunnion 18,18'. Each trunnion 18,18' includes an outer surface 72 and an annular groove 74 formed in the outer surface 72 and extending through the outboard end 70,70' of each trunnion 18,18'. Each ring 68 is disposed in the annular groove 74 of one of the trunnions 18,18'. Each groove 74 includes a radius 75 at an inboard end of the groove and each ring 68 includes a mating chamfer 69 so as to avoid a stress riser at this location in trunnion 18,18'. Rings 68 preferably comprise a one-piece construction, as shown in FIGS. 1 and 2, and are preferably made of a ferrous metal such as a steel alloy or iron. Alternatively, rings 68 may be made of a composite material, such as a material which includes silicone or graphite fibers. Additionally, as best seen in FIG. 2 each ring 68 includes a generally rectangular-shaped cross-section. In a preferred embodiment, when rings 68 are made of a ferrous metal, rings 68 are preferably cast-in-place in groove 74 of trunnion 18,18' which is accomplished during the process of casting axle carrier 12. In this instance, rings 68 are positioned within the mold used to cast carrier 12 and the molten metal, preferably aluminum or magnesium, is poured into the mold around the pair of rings 68 thereby forming bonds retaining each ring 68 in place in the corresponding groove 74. Alternatively, each ring 68 may be pressed in place in a corresponding one of grooves 74. It should be understood that the cast-in-place method of attaching rings 68 to carrier 12 may not be used when ring 68 is made of a composite material, due to the incompatibility of the composite material with the temperature of the molten metal used to cast axle carrier 12.

Axle assembly 10 may alternatively include a pair of rings 68', with each ring 68' being disposed in the groove 74 of one of the trunnions 18,18'. As shown in FIGS. 3 and 4, each ring 68' includes first and second generally semi-circular portions 76 and 78, respectively. Portions 76 and 78 of each ring 68' are disposed in the groove 74 of one of the trunnions 18,18'. Portion 76 of ring 68' includes a pair of circumferentially facing mount flanges 80 and similarly, portion 78 includes a pair of circumferentially facing mount flanges 82. The semi-circular portions 76 and 78 of ring 68' are fastened to one another by conventional means such as bolts 83 and nuts 85, with bolts 83 passing through holes formed in the flanges 80 of portions 76 and the mating flanges 82 of portion 78. As with ring 68, ring 68' is preferably made of a ferrous metal such as a steel alloy or iron. Alternatively, as with ring 68, ring 68' may be made of a composite material, such as a material which includes silicone fibers or graphite. It should be understood that ring 68' may not be cast-in-place during the casting of axle carrier 12. As with ring 68, ring 68' includes a generally rectangular-shaped cross-section.

Rings 68 and 68' include a radial thickness 84 and 84', respectively. Trunnions 18,18' include an annular wall 86 having a radial thickness 88. Rings 68 and 68' are sized so that the corresponding radial thicknesses 84 and 84', respectively, are significantly less than the radial thickness 88 of each trunnion 18. The ratio of either thickness 84 or 84', to the radial thickness 88 may range from approximately 0.4 to 0.6. Rings 68 and 68' further include an axial width 90 and 90', respectively, with widths 90 and 90' preferably ranging from 0.500 to 0.750 inches. It should be understood that the ratio of the radial thickness of rings 68 and 68' to the radial thickness 88 of the annular wall 86 of trunnions 18,18' as well as the axial widths 90 and 90' of rings 68 and 68', respectively, may vary outside of the aforementioned ranges for particular applications.

In operation, the suspension loads of the vehicle which are applied to axle assembly 10 at the locations of the spring attachments (not shown) and also at the vehicle wheels (not shown), create relatively large bending moments at the respective interfaces of trunnions 18,18' and axle tubes 24,24', resulting in relatively large circumferential stresses in trunnions 18,18'. Trunnions 18,18' must also withstand a hoop stress due to the interference fit between axle tubes 24,24' and trunnions 18,18'. Similar combined stress fields have been known to cause cracks to initiate at the outboard ends of prior aluminum trunnions, not reinforced by rings 68 or 68', during overload testing. The use of reinforcing rings 68, or 68', which are made of a ferrous metal or a composite material, significantly increases the load carrying capacity of trunnions 18,18'.

Since rings 68 or 68' are located in grooves 74 formed in the outer surface 72 of trunnions 18,18', the machining of the inner surface of trunnions 18,18', which engages the outer surface of axle tubes 24,24', is not adversely affected. This machining is relatively easy, due to the use of aluminum or magnesium alloys to manufacture each trunnion 18,18'. If ring 68 or 68' extended to the inner surface of trunnions 18,18', the machining of the inner surface of trunnions 18,18' would be significantly more difficult. In addition to being used with new axle assemblies 10, rings 68 and 68' may be advantageously utilized in the field retrofit of existing axle assemblies.

Figure 5:
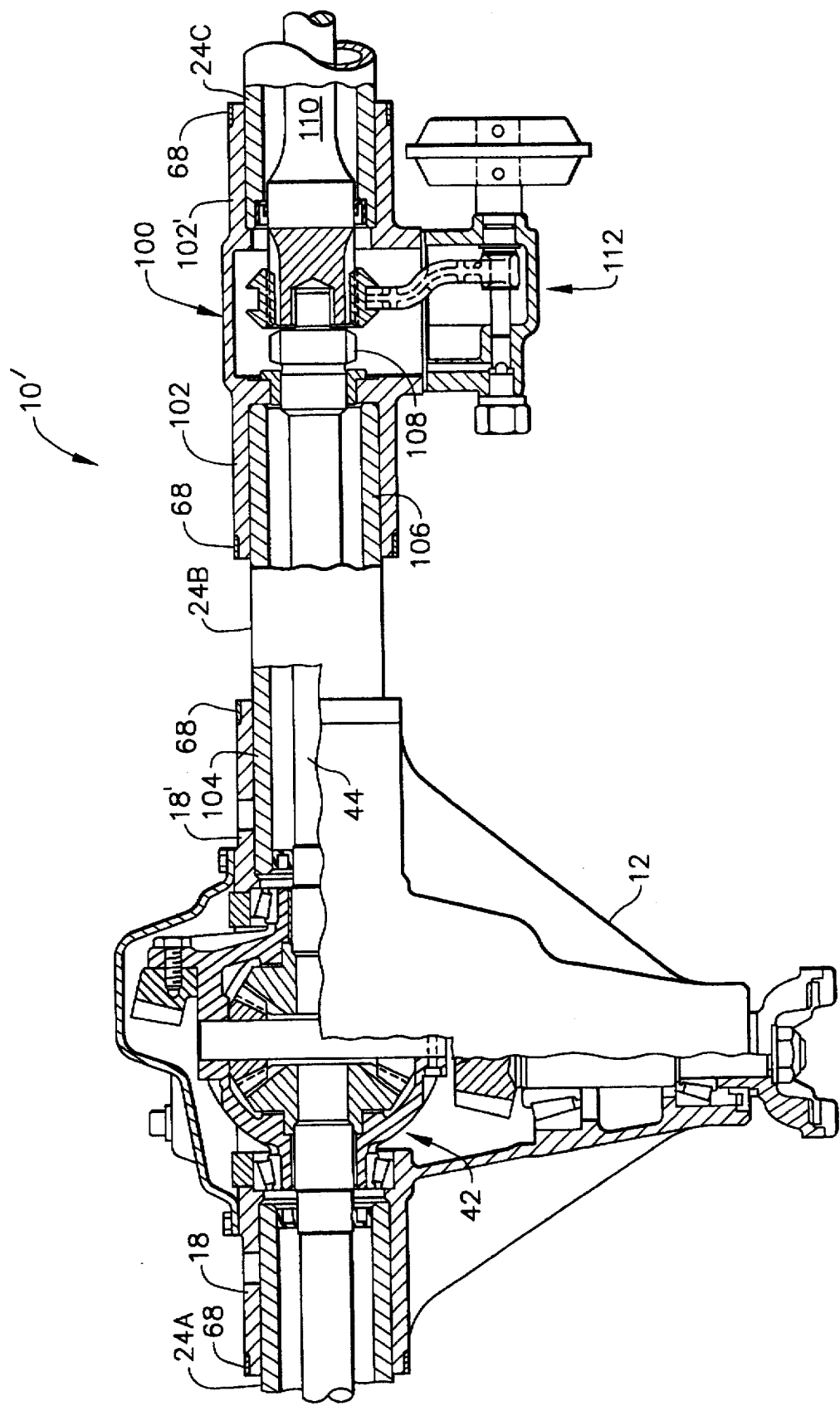
FIG. 5 is a cross-sectional top view illustrating an axle drive assembly incorporating an axle carrier and a disconnect housing structure, according to an alternative embodiment of the present invention.
Figure 6:
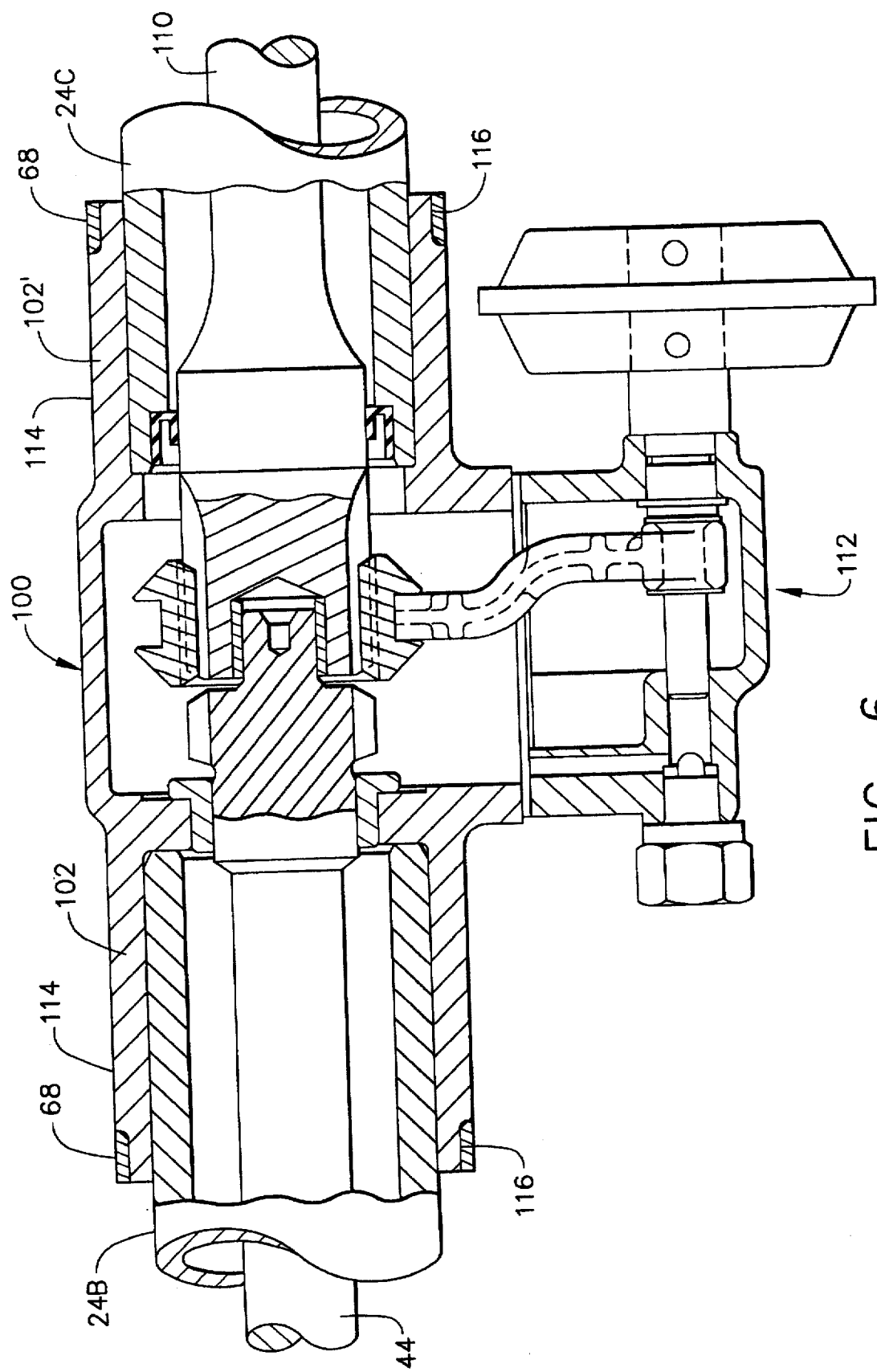
FIG. 6 is an enlarged cross-sectional top view of the disconnect housing shown in FIG. 5.

Referring now to FIGS. 5 and 6, an axle assembly 10' is illustrated according to an alternative embodiment of the present invention. Axle assembly 10' includes the elements of assembly 10, including axle carrier 12 and the differential assembly 42 contained therein, and further includes a disconnect housing indicated generally at 100. As with assembly 10, axle assembly 10' preferably comprises a front axle assembly but alternatively may comprise a mar axle assembly. Disconnect housing 100 includes a pair of axially spaced apart trunnions 102,102'. Assembly 10' includes three axle tubes 24, designated tubes 24A, 24B and 24C. Axle tube 24B extends axially between axle carrier 12 and disconnect housing 100, and has a first end 104 inserted into one of the trunnions 18,18' of axle carrier 12 and has an opposite end 106 inserted into one of the trunnions 102,102' of disconnect housing 100. Output shaft 44, which is driven by differential assembly 42, is housed within tube 24B and terminates in an outboard end 108 disposed within disconnect housing 100. The outboard end 108 of output shaft 44 may be selectively connected with, or disconnected from, an axle shaft 110 which is drivingly coupled with the vehicle wheel, via an actuator assembly indicated generally at 112.

It should be understood that shaft 44 may be selectively connected with, or disconnected from, shaft 110 by any other conventional actuator assembly.

Disconnect housing 100 is a support structure for supporting the corresponding axle tubes 24 and is made of a non-ferrous metallic alloy. Each trunnion 102,102' includes a generally cylindrical outer surface 114 and an annular groove 116 formed in outer surface 114. One of the reinforcing rings 68 is disposed in the groove 116 of each trunnion 102,102' and increases the mechanical strength of trunnions 102,102' in the same manner as discussed previously with respect to trunnions 18,18' of assembly 10. Accordingly, each ring 68 may either be cast-in-place or pressed in place if the ring 68 is made of ferrous material, or pressed in place if the ring 68 is made of composite material. Alternatively, one of the rings 68', discussed previously, may be inserted in the groove 116 of trunnion 102, with the two semi-circular portions 76 and 78 of each ring 68' being fastened to one another as discussed previously. It is noted that assembly 10' also includes a pair of rings 68 attached to the trunnions 18,18' of axle carrier 12 as discussed previously with respect to assembly 10.

While the foregoing description has set forth the preferred embodiments in particular detail, it must be understood that numerous modifications, substitutions and changes can be undertaken without departing from the true spirit and scope of the present invention as defined by the ensuing claims. For instance, the trunnion rings of the present invention may be advantageously utilized in conjunction with trunnions included in structural support systems other than those shown in the illustrated embodiments. The invention is therefore not limited to specific preferred embodiments as described, but is only limited as defined by the following claims.

What is claimed is:

1. A support structure for supporting a hollow axle tube, comprising:
    a pair of trunnions adapted to receive the hollow axle tube, wherein each of said pair of trunnions includes an outer surface and an outwardly extending end and an annular groove is formed in said outer surface of each of said trunnions, said annular groove extending to said outwardly extending end; and
    a pair of annular reinforcing rings, one of said pair of annular reinforcing rings being disposed in said annular groove in each of said pair of trunnions, said pair of annular reinforcing rings extending to said outwardly extending end of each of said pair of trunnions.

2. The support structure as recited in claim 1, wherein:
    each of said pair of trunnions are made of a non-ferrous metallic alloy; and
    each of said pair of annular reinforcing rings are made of a ferrous metal.

3. The support structure as recited in claim 2, wherein:
    each of said pair of trunnions are a casting; and
    each of said pair of annular reinforcing rings are a prefabricated, one-piece construction bonded to each of said pair of trunnions.

4. The support structure as recited in claim 3, wherein each of said pair of trunnions are made of a cast aluminum alloy.

5. The support structure as recited in claim 3, wherein each of said pair of trunnions are made of a cast magnesium alloy.

6. The support structure as recited in claim 2, wherein: each of said pair of annular reinforcing rings are a prefabricated, one-piece construction which is engaged with each of said pair of trunnions in an interference fit.

7. The support structure as recited in claim 2, wherein each of said pair of annular reinforcing rings are made of a steel alloy.

8. The support structure as recited in claim 2, wherein each of said pair of annular reinforcing rings are made of iron.

9. The support structure as recited in claim 2, wherein each of said pair of annular reinforcing rings have a rectangular-shaped cross-section.

10. The support structure as recited in claim 1, wherein:
    each of said pair of trunnions are made of a non-ferrous metallic alloy; and
    each of said pair of annular reinforcing rings are made of a composite material.

11. The support structure as recited in claim 10, wherein each of said pair of annular reinforcing rings are a prefabricated, one-piece construction engaged with each of said pair of trunnions in an interference fit.

12. The support structure as recited in claim 10, wherein each of said pair of annular reinforcing rings have a rectangular-shaped cross-section.

13. The support structure as recited in claim 1, wherein each of said pair of annular reinforcing rings have a rectangular-shaped cross-section.

14. The support structure as recited in claim 13, wherein:
    each of said pair of trunnions are made of a non-ferrous metallic alloy; and
    each of said pair of annular reinforcing rings are made of a composite material.

15. An axle assembly, comprising:
    a support structure having a pair of axially spaced trunnions, wherein each of said trunnions includes an outer surface and an outwardly extending end and an annular groove is formed in said outer surface of said trunnion, said annular groove extending to said outwardly extending ends;
    first and second axle tubes, each of said axle tubes having a first end inserted into one of said trunnions; and
    first and second reinforcing rings, each of said reinforcing rings being disposed in said annular groove of a corresponding one of said trunnions, said first and second reinforcing rings extending to said outwardly extending ends of said axially spaced trunnions.

16. The axle assembly as recited in claim 15, said support structure is an axle carrier made of a non-ferrous metallic alloy, wherein each of said reinforcing rings is made of a ferrous metal.

17. The axle assembly as recited in claim 16, wherein each of said annular reinforcing rings have a rectangular-shaped cross-section.

18. The axle assembly as recited in claim 15, wherein said support structure is an axle carrier made of a non-ferrous metallic alloy, wherein each of said reinforcing rings is made of a composite material.

19. The axle assembly as recited in claim 18, wherein each of said annular reinforcing rings have a rectangular-shaped cross-section.

20. The axle assembly as recited in claim 15, wherein each of said annular reinforcing rings have a rectangular-shaped cross-section.

* * * * *